(12) United States Patent
Sinha et al.

(10) Patent No.: US 12,074,659 B2
(45) Date of Patent: Aug. 27, 2024

(54) ADJUSTING COMMUNICATION LINK FOR USER BEHAVIOR IN APPLICATION

(71) Applicant: QUALCOMM Incorporated, San Diego, CA (US)

(72) Inventors: Surbhit Sinha, San Diego, CA (US); Peerapol Tinnakornsrisuphap, San Diego, CA (US); Bojan Vrcelj, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 37 days.

(21) Appl. No.: 18/051,199

(22) Filed: Oct. 31, 2022

(65) Prior Publication Data
US 2024/0146428 A1    May 2, 2024

(51) Int. Cl.
H04B 17/373    (2015.01)
H04L 67/131    (2022.01)

(52) U.S. Cl.
CPC ......... *H04B 17/373* (2015.01); *H04L 67/131* (2022.05)

(58) Field of Classification Search
CPC .............................. H04B 17/373; H04L 67/131
See application file for complete search history.

(56) References Cited

U.S. PATENT DOCUMENTS

| | | | | |
|---|---|---|---|---|
| 10,412,529 | B1 * | 9/2019 | Dantrey | H04S 7/303 |
| 10,515,485 | B2 * | 12/2019 | Mallinson | G02B 26/10 |
| 11,563,513 | B1 * | 1/2023 | Lohr | G06F 3/011 |
| 2017/0078447 | A1 * | 3/2017 | Hancock | H04N 21/4424 |
| 2017/0330545 | A1 * | 11/2017 | Clement | G10H 1/0008 |
| 2017/0336860 | A1 * | 11/2017 | Smoot | G06F 3/016 |
| 2018/0096494 | A1 * | 4/2018 | Zhou | G06T 19/006 |
| 2018/0096518 | A1 * | 4/2018 | Mallinson | G06F 3/012 |
| 2018/0110055 | A1 * | 4/2018 | Kim | H04B 17/373 |
| 2018/0270531 | A1 * | 9/2018 | Ye | H04L 43/16 |
| 2018/0275748 | A1 * | 9/2018 | Haraden | G06T 15/503 |
| 2018/0286007 | A1 * | 10/2018 | Poornachandran | H04L 67/34 |
| 2018/0341323 | A1 * | 11/2018 | Mate | A63F 13/355 |
| 2019/0037462 | A1 * | 1/2019 | Chowdhury | H04W 36/142 |
| 2019/0364492 | A1 | 11/2019 | Azizi et al. | |
| 2020/0112625 | A1 * | 4/2020 | Hancock | H04L 65/80 |
| 2020/0128105 | A1 * | 4/2020 | Liu | H04L 65/612 |
| 2020/0374863 | A1 * | 11/2020 | Lin | H04W 72/046 |
| 2021/0240258 | A1 * | 8/2021 | Son | G02B 27/017 |
| 2022/0255611 | A1 * | 8/2022 | Chavva | H04B 17/318 |
| 2022/0284681 | A1 * | 9/2022 | Im | G06F 3/012 |

(Continued)

OTHER PUBLICATIONS

International Search Report and Written Opinion—PCT/US2023/074542—ISA/EPO—Dec. 15, 2023.

*Primary Examiner* — Javier O Guzman
(74) *Attorney, Agent, or Firm* — Harrity & Harrity, LLP

(57) ABSTRACT

Various aspects of the present disclosure generally relate to wireless communication. In some aspects, a wireless communication device may predict user behavior in an extended reality (XR) application on a user equipment (UE) based at least in part on current content presented by the XR application. The wireless communication device may predict channel information for a communication link of the UE based at least in part on the predicted user behavior. The wireless communication device may adjust one or more parameters of the communication link based at least in part on the predicted channel information. Numerous other aspects are described.

30 Claims, 10 Drawing Sheets

(56) References Cited

U.S. PATENT DOCUMENTS

2023/0016490 A1\*  1/2023  Berkebile .............. G06F 3/011
2023/0246698 A1\*  8/2023  Bastani ................ H04B 7/0695
                                                   370/310

\* cited by examiner

ADJUSTING COMMUNICATION LINK FOR USER BEHAVIOR IN APPLICATION

FIELD OF THE DISCLOSURE

Aspects of the present disclosure generally relate to wireless communication and to techniques and apparatuses for adjusting a communication link for user behavior in an application.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a wireless communication device. The method may include predicting user behavior in an extended reality (XR) application on a user equipment (UE) based at least in part on current content presented by the XR application. The wireless communication device may be the UE. The method may include predicting channel information for a communication link of the UE based at least in part on the predicted user behavior. The method may include adjusting one or more parameters of the communication link based at least in part on the predicted channel information.

Some aspects described herein relate to a method of wireless communication performed by a content provider device. The method may include receiving location information and position information for a UE in association with an XR application on the UE. The method may include predicting user behavior in the XR application. The method may include obtaining predicted channel information for a communication link of the UE that is predicted based at least in part on the predicted user behavior. The method may include generating content for the XR application based at least in part on the location information, the position information, and the predicted channel information. The method may include transmitting the content for the XR application.

Some aspects described herein relate to a wireless communication device for wireless communication. The wireless communication device may include a memory and one or more processors coupled to the memory. The one or more processors may be configured to predict user behavior in an XR application on a UE based at least in part on current content presented by the XR application. The one or more processors may be configured to predict channel information for a communication link of the UE based at least in part on the predicted user behavior. The one or more processors may be configured to adjust one or more parameters of the communication link based at least in part on the predicted channel information.

Some aspects described herein relate to a content provider device for wireless communication. The content provider device may include a memory and one or more processors coupled to the memory. The one or more processors may be configured to receive location information and position information for a UE in association with an XR application on the UE. The one or more processors may be configured to predict user behavior in the XR application. The one or more processors may be configured to obtain predicted channel information for a communication link of the UE that is predicted based at least in part on the predicted user behavior. The one or more processors may be configured to generate content for the XR application based at least in part on the location information, the position information, and the predicted channel information. The one or more processors may be configured to transmit the content for the XR application.

Some aspects described herein relate to a non-transitory computer-readable medium that stores a set of instructions for wireless communication by a wireless communication device. The set of instructions, when executed by one or more processors of the wireless communication device, may cause the wireless communication device to predict user behavior in an XR application on a UE based at least in part on current content presented by the XR application. The set of instructions, when executed by one or more processors of the wireless communication device, may cause the wireless communication device to predict channel information for a communication link of the UE based at least in part on the predicted user behavior. The set of instructions, when executed by one or more processors of the wireless communication device, may cause the wireless communication device to adjust one or more parameters of the communication link based at least in part on the predicted channel information.

Some aspects described herein relate to a non-transitory computer-readable medium that stores a set of instructions for wireless communication by a content provider device. The set of instructions, when executed by one or more processors of the content provider device, may cause the content provider device to receive location information and position information for a UE in association with an XR application on the UE. The set of instructions, when executed by one or more processors of the content provider device, may cause the content provider device to predict user behavior in the XR application. The set of instructions, when executed by one or more processors of the content provider device, may cause the content provider device to obtain predicted channel information for a communication link of the UE that is predicted based at least in part on the predicted user behavior. The set of instructions, when executed by one or more processors of the content provider device, may cause the content provider device to generate content for the XR application based at least in part on the location information, the position information, and the predicted channel information. The set of instructions, when executed by one or more processors of the content provider device, may cause the content provider device to transmit the content for the XR application.

Some aspects described herein relate to an apparatus for wireless communication. The apparatus may include means for predicting user behavior in an XR application on a UE based at least in part on current content presented by the XR application. The apparatus may include means for predicting channel information for a communication link of the UE based at least in part on the predicted user behavior. The apparatus may include means for adjusting one or more parameters of the communication link based at least in part on the predicted channel information.

Some aspects described herein relate to an apparatus for wireless communication. The apparatus may include means for receiving location information and position information for a UE in association with an XR application on the UE. The apparatus may include means for predicting user behavior in the XR application. The apparatus may include means for obtaining predicted channel information for a communication link of the UE that is predicted based at least in part on the predicted user behavior. The apparatus may include means for generating content for the XR application based at least in part on the location information, the position information, and the predicted channel information. The apparatus may include means for transmitting the content for the XR application.

Aspects generally include a method, apparatus, system, computer program product, non-transitory computer-readable medium, UE, base station, network entity, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
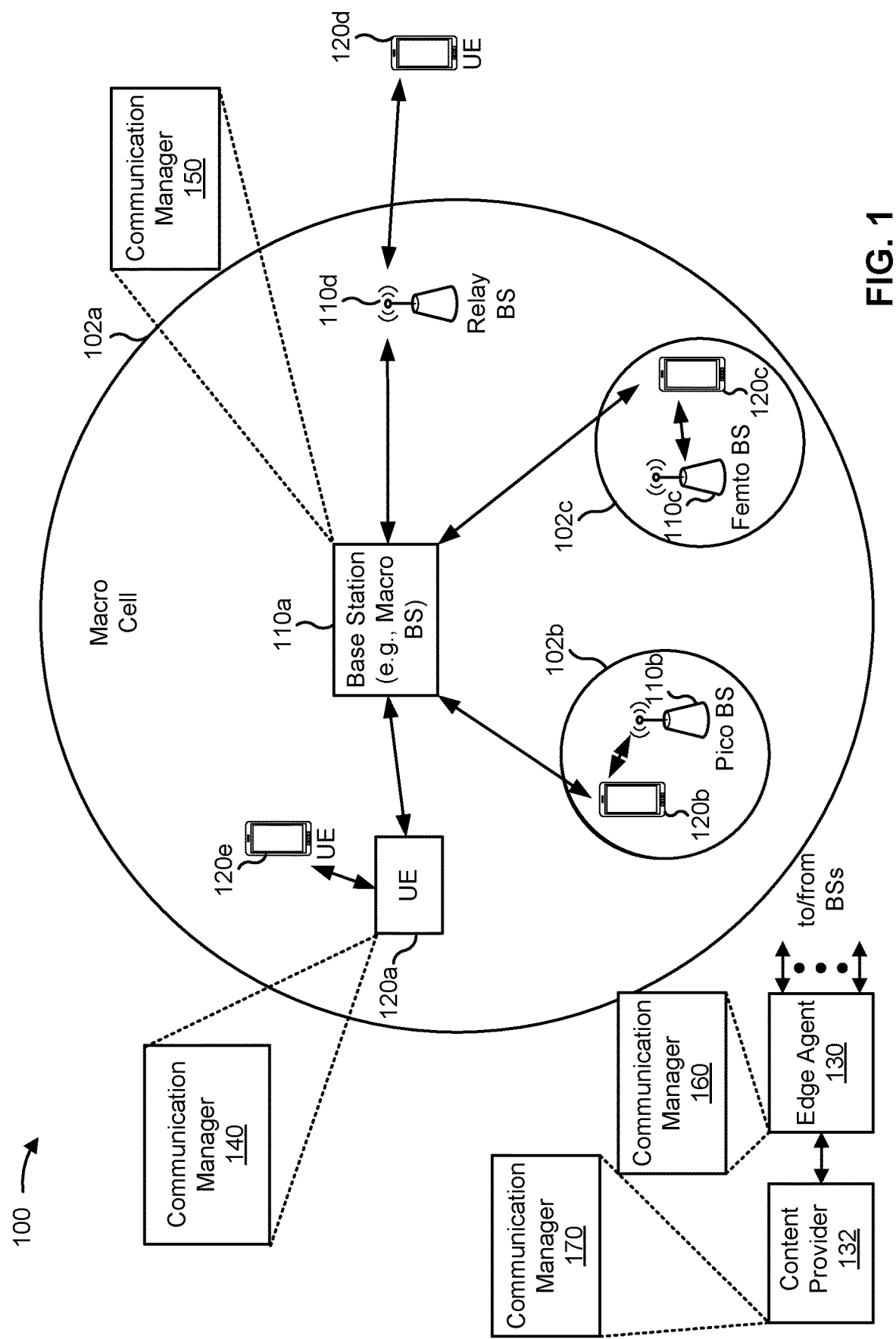
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

In some aspects, the term "base station" (e.g., the base station 110) or "network entity" may refer to an aggregated base station, a disaggregated base station, an integrated access and backhaul (IAB) node, a relay node, and/or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network entity" may refer to one device configured to perform one or more functions, such as those described herein in connection with the base station 110. In some aspects, the term "base station" or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network entity" may refer to any one or more of those different devices. In some aspects, the term "base station" or "network entity" may refer to one or more virtual base stations and/or one or more virtual base station functions. For example, in some aspects, two or more base station functions may be instantiated on a single device. In some aspects, the term "base station" or "network entity" may refer to one of the base station functions and not another. In this way, a single device may include more than one base station.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller may couple to or communicate with a set of base stations 110 and may provide coordination and control for these base stations 110. The network controller may communicate with the base stations 110 via a backhaul communication link. The base stations 110 may communicate with one another directly or indirectly via a wireless or wireline backhaul communication link.

An edge agent 130 may communicate with UEs 120 via the base stations 110 or other network entities. The edge agent 130 may store data and handle processing for an application on one or more UEs 120. The edge agent 130 may also communicate with a content provider 132 or an application server for the application. The content provider 132 may store and render content for the application.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, a wireless device (e.g., UE 120, base station 110, edge agent 130, network entity) may include a communication manager 140, 150, or 160. As described in more detail elsewhere herein, the communication manager 140, 150, or 160 may predict user behavior in an extended reality (XR) application on a UE based at least in part on current content presented by the XR application. The wireless device may be the UE or a network entity such as a base station or an edge agent. The communication manager 140, 150, or 160 may predict channel information for a communication link of the UE based at least in part on the predicted user behavior. The communication manager 140, 150, or 160 may adjust one or more parameters of the communication link based at least in part on the predicted channel information. Additionally, or alternatively, the communication manager 140, 150, or 160 may perform one or more other operations described herein.

In some aspects, a content provider device (e.g., content provider 132) may include a communication manager 170. As described in more detail elsewhere herein, the communication manager 170 may receive location information and position information for a UE in association with an XR application on the UE. The content provider may be at the UE or at a separate network entity. The communication manager 170 may predict user behavior in the XR application and obtain predicted channel information for a communication link of the UE that is predicted based at least in part on the predicted user behavior. The communication manager 170 may generate content for the XR application based at least in part on the location information, the position information, and the predicted channel information. The communication manager 170 may transmit the content for the XR application. Additionally, or alternatively, the communication manager 170 may perform one or more other operations described herein.

As indicated above, FIG. 1 is provided as an example. Other examples may differ from what is described with regard to FIG. 1.

Figure 2:
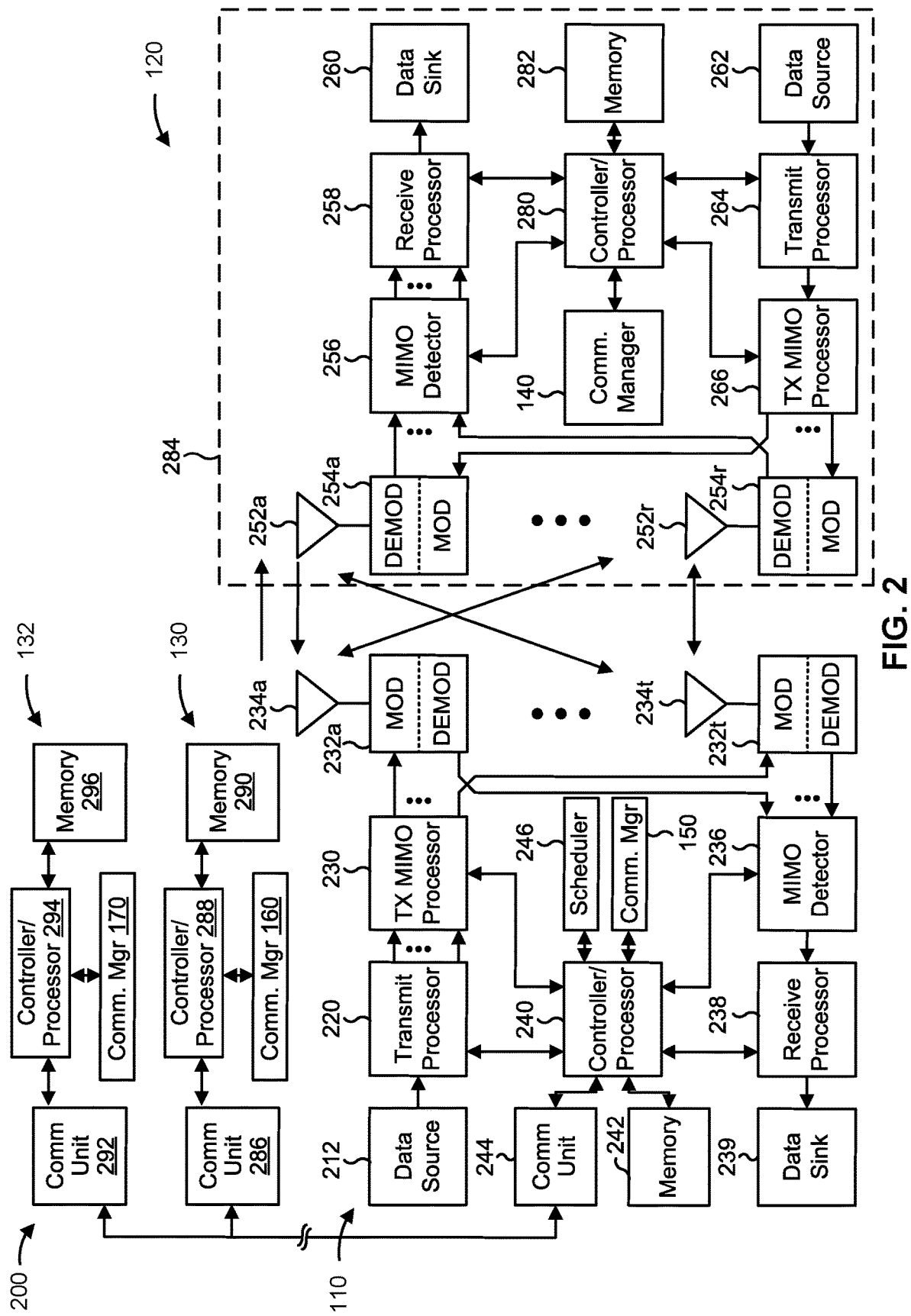
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The edge agent 130 may include a communication unit 286, a controller/processor 288, and a memory 290. The edge agent 130 may communicate with the base station 110 and/or a content provider 132 via the communication unit 286. The content provider may include a communication unit 292, a controller/processor 294, and a memory 296.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor of a network entity (e.g., controller/processor 240 of the base station 110, controller/processor 288 of the edge agent 130, controller processor 294 of the content provider 132), the controller/processor 280 of the UE 120, and/or any other component(s) of FIG. 2 may perform one or more techniques associated with adjusting a communication link for user behavior in an application, such as an XR application, as described in more detail elsewhere herein. A wireless communication device may include the UE 120, the edge agent 130, or another network entity (e.g., base station 110). A content provider may include the UE 120, the edge agent 130, the content provider 132, or another network entity (e.g., base station 110). For example, the controller/processor 288 of the edge agent 130, the controller/processor 294 of the content provider 132, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242, the memory 282, the memory 290, and/or the memory 296 may store data and program codes for the base station 110, the UE 120, the edge agent 130, and the content provider 132, respectively. In some examples, the memory 242, the memory 282, the memory 290, and/or the memory 296 may include a non-transitory computer-readable medium storing one or more instructions (e.g., code and/or program code) for wireless communication. For example, the one or more instructions, when executed (e.g., directly, or after compiling, converting, and/or interpreting) by one or more processors of a network entity (e.g., base station 110), the UE 120, the edge agent 130, and/or the content provider 132, may cause the one or more processors, the network entity, the UE 120, the edge agent 130, and/or the content provider 132 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, a wireless communication device (e.g., UE 120, edge agent 130, a network entity) includes means for predicting user behavior in an XR application on a UE based at least in part on current content presented by the XR application; means for predicting channel information for a communication link of the UE based at least in part on the predicted user behavior; and/or means for adjusting one or more parameters of the communication link based at least in part on the predicted channel information. In some aspects, the means for the wireless communication device to perform operations described herein may include, for example, one or more of communication manager 140, antenna 252, modem 254, MIMO detector 256, receive processor 258, transmit processor 264, TX MIMO processor 266, controller/processor 280, or memory 282. In some aspects, the means for the content provider device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246. In some aspects, the means for the wireless communication device to perform operations described herein may include, for example, one or more of communication manager 160, communication unit 286, controller/processor 288, or memory 290.

In some aspects, a content provider device (e.g., content provider 132, edge agent 130, a network entity) includes means for receiving location information and position information for a UE in association with an XR application on the UE; means for predicting user behavior in the XR application; means for obtaining predicted channel information for a communication link of the UE that is predicted based at least in part on the predicted user behavior; means for generating content for the XR application based at least in part on the location information, the position information, and the predicted channel information; and/or means for transmitting the content for the XR application. In some aspects, the means for the content provider device to perform operations described herein may include, for example, one or more of communication manager 170, communication unit 292, controller/processor 294, or memory 296. In some aspects, the means for the content provider device to perform operations described herein may include, for example, one or more of communication manager 160, communication unit 286, controller/processor 288, or memory 290. In some aspects, the means for the content provider device to perform operations described herein may include, for example, one or more of communication manager 150, controller/processor 240, or memory 242.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
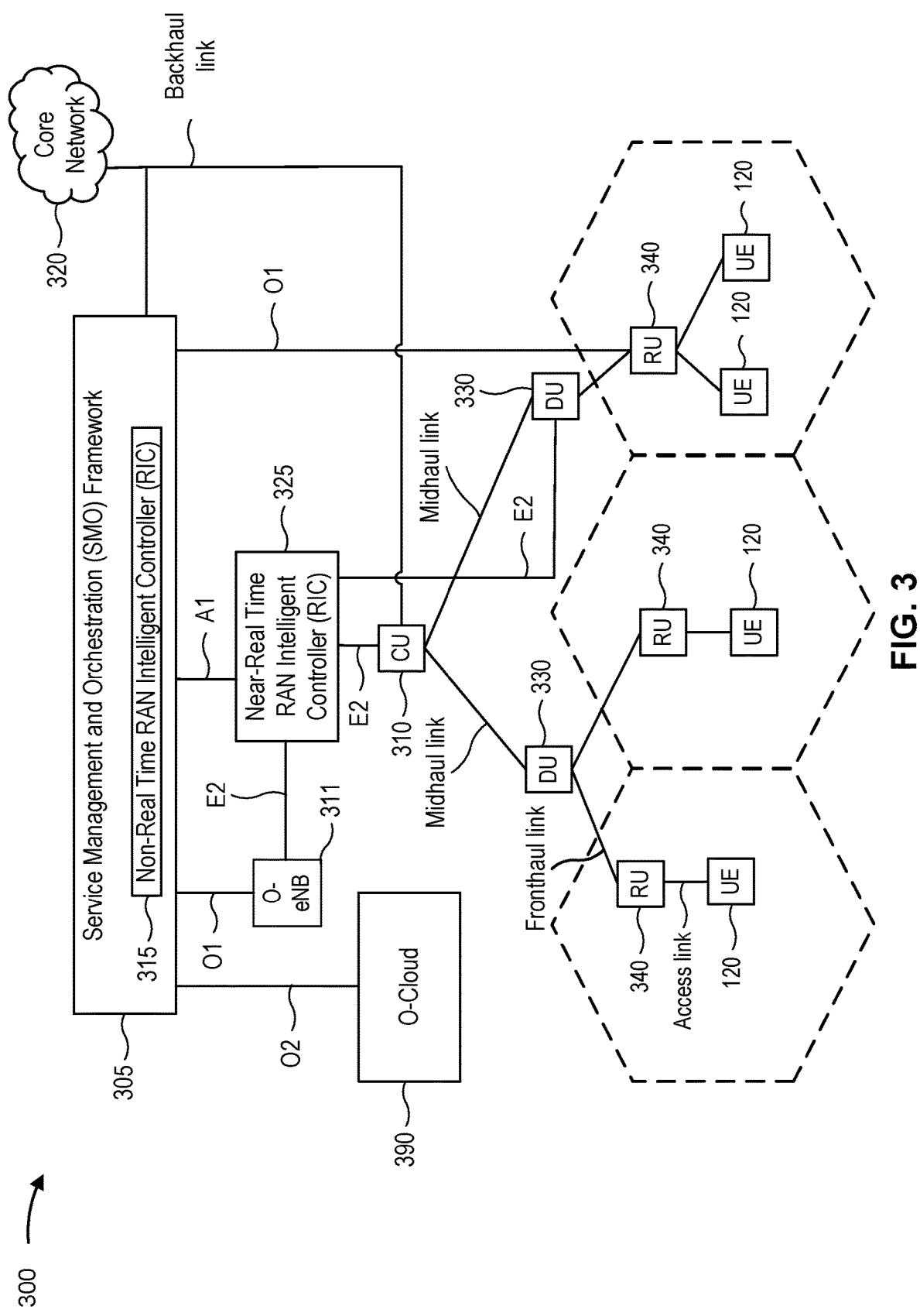
FIG. 3 is a diagram illustrating an example of a disaggregated base station, in accordance with the present disclosure.

FIG. 3 is a diagram illustrating an example of a disaggregated base station 300, in accordance with the present disclosure.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station, or one or more units (or one or more components) performing base station functionality, may be implemented in an aggregated or disaggregated architecture. For example, a BS (such as a Node B, evolved NB (eNB), NR BS, 5G NB, access point (AP), a TRP, or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station 300 architecture may include one or more CUs 310 that can communicate directly with a core network 320 via a backhaul link, or indirectly with the core network 320 through one or more disaggregated base station units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as an F1 interface.

The DUs 330 may communicate with one or more RUs 340 via respective fronthaul links. The fronthaul link, the midhaul link, and the backhaul link may be generally referred to as "communication links." The RUs 340 may communicate with respective UEs 120 via one or more RF access links. In some aspects, the UE 120 may be simultaneously served by multiple RUs 340. The DUs 330 and the RUs 340 may also be referred to as "O-RAN DUs (O-DUs)" and "O-RAN RUs (O-RUs)", respectively. A network entity may include a CU, a DU, an RU, or any combination of CUs, DUs, and RUs. A network entity may include a disaggregated base station or one or more components of the disaggregated base station, such as a CU, a DU, an RU, or any combination of CUs, DUs, and RUs. A network entity may also include one or more of a TRP, a relay station, a passive device, an intelligent reflective surface (IRS), or other components that may provide a network interface for or serve a UE, mobile station, sensor/actuator, or other wireless device.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit—User Plane (CU-UP)), control plane functionality (i.e., Central Unit—Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3GPP. In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT MC 325 and may be received at the SMO Framework 305 or the Non-RT RIC 315 from non-network data sources or from network functions. In some examples, the Non-RT MC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
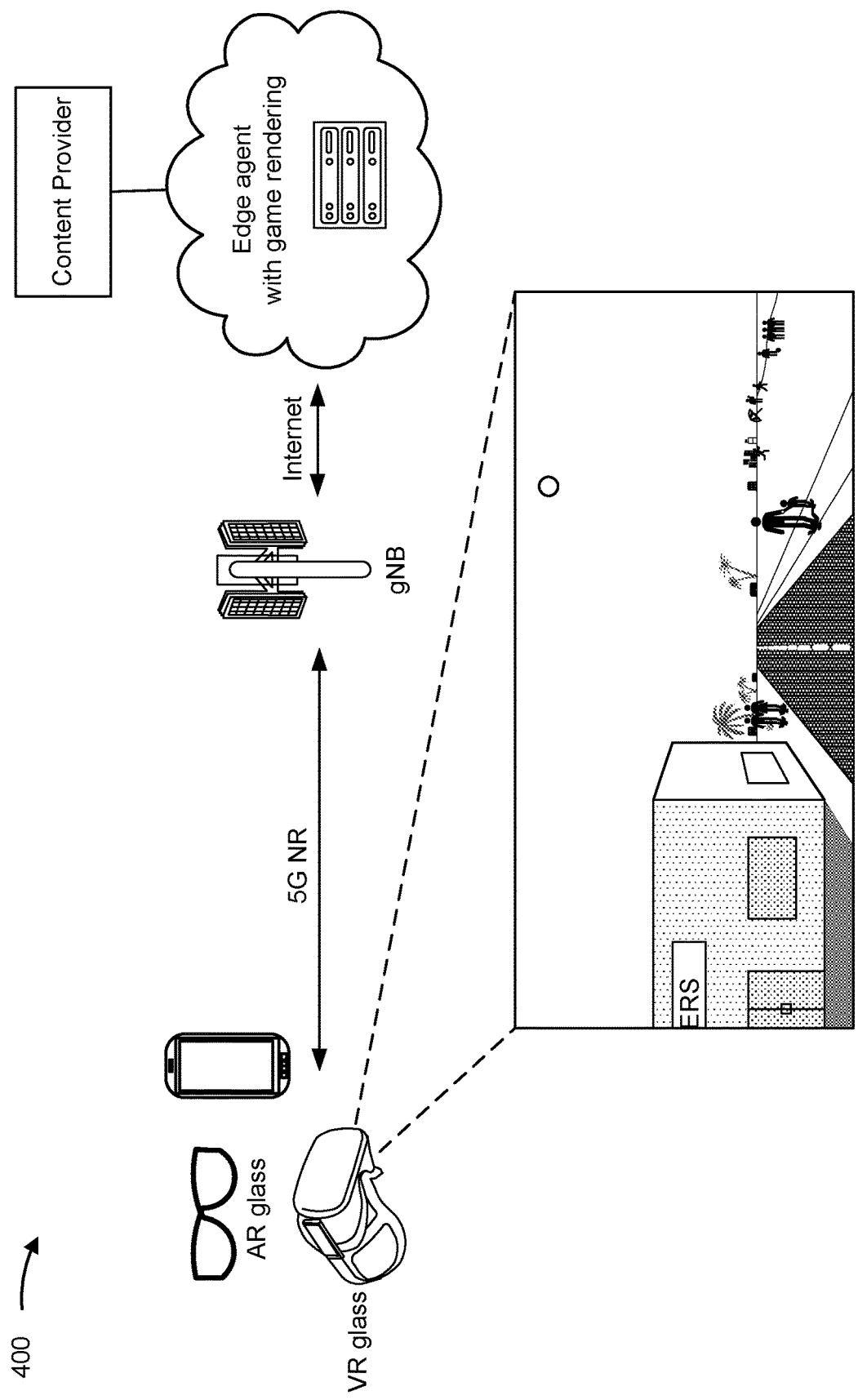
FIG. 4 is a diagram illustrating an example of applications for different environments, in accordance with the present disclosure.

FIG. 4 is a diagram illustrating an example 400 of applications for different environments, in accordance with the present disclosure.

Applications for NR devices may include applications for XR, which may expect low-latency traffic to and from an edge agent (e.g., edge agent 130, edge server) or a cloud environment. Example 400 shows communications between an XR device and the edge agent or the cloud environment, via a network entity (e.g., gNB). The XR device may be an augmented reality (AR) glasses device, a virtual reality (VR) glasses device, or a gaming device. The XR device may split computations for an application with the edge agent on the other side of the network entity.

Some NR applications involve a user navigating as an avatar in a virtual environment or metaverse, such as shown in example 400. The metaverse is a combination of the virtual reality and physical worlds that mirror aspects of real life. Users and businesses can explore, create, socialize, and participate in a variety of communities. The metaverse may involve massive XR, which includes high link capacity, high reliability, and low latency for many users. The metaverse may also include a perception of the real world or an understanding of the surrounding environment of a user.

In NR applications such as these, a network entity and a UE may communicate with one another via one or more beams. The user experience may depend on the quality of the wireless link, given the latency and reliability requirements. The experience could be severely affected when the user enters an area of bad radio reception. The area may have bad reception due to bad coverage or objects that block beams. Beam blocking may result in an abrupt decrease (e.g., below a threshold such as a noise floor) in the useful signal strength received for the beam and/or adjacent beams in a beam set that includes the beam. Affected areas could be low signal-to-noise ratio (SNR) regions, far cell regions, areas with severe blockage, etc. In such areas, the low throughput and high packet loss rate can increase the latency beyond the latency expectations. This latency could lead to glitches or lag in the rendered virtual environment.

According to various aspects described herein, to improve the user experience and wireless channel behavior, the wireless device rendering the application (e.g., XR device, UE associated with the XR device, edge agent) may utilize inter-dependencies between a communication link for the XR application and application content. In some aspects, the wireless device may predict user behavior from content (e.g., current content rendered in the XR application). For example, the wireless device may predict a position of the UE, an orientation (e.g., direction) of the UE, a movement of the UE, and/or a position (e.g., head pose, body pose) of a user of the UE in association with the current content of the XR application. The predictions may involve the 6 degrees of freedom (6DoF). The wireless device may predict a game state of the XR application, an amount of activity of a user of the UE in the XR application, and/or a type of activity of the user. The wireless device may use the predicted user behavior to predict wireless channel information (e.g., channel state information (CSI)) based at least in part on where the user will be located physically and what the XR application is expected to render.

The wireless device may use the predicted wireless channel information to adjust communication link parameters or an algorithm. For example, if the predicted wireless channel behavior includes predicted poor channel conditions, the wireless device may use a more conservative MCS selection and rate adaption prior to the predicted poor channel conditions. The communication link parameters may be adjusted to increase or decrease a transmit power. The parameters may be adjusted to switch beams for communication on the communication link. The wireless device may also generate content for the XR application based at least in part on the adjusted parameters. For example, the XR application may reorient content to maneuver around limitations of the wireless channel.

In some aspects, the wireless device may obtain a wireless channel survey using context from the environment to enhance the user experience. The wireless channel survey may include a prediction of a radio frequency (RF) environment surrounding the user. The RF environment prediction may map RF characteristics (e.g., RSRP, SNR, interference, reliability) to geographical areas around the user (UE of the user). The RF environment prediction may be an RF heat map, where hot areas have better reception than cold areas. The predicted RF environment may be 3D and may note buildings, locations of other users, base stations, reflections, and/or other objects or observations that affect RF reception/transmission and user movement. The wireless device may generate content for the XR application based at least in part on the RF predicted environment, because the RF predicted environment is associated with performance of the communication link.

In some aspects, the wireless device may reorient content of the application to influence a user of the application to enter physical geographical areas to predict the wireless channel and to build out the wireless channel survey. This may include placing content to be found in the geographical areas that are to be surveyed. For example, if an XR application involves AR creatures that appear to be in areas around the user, the XR application may place such an AR creature to appear in an area that is to be surveyed.

In some aspects, the wireless device may combine perception information obtained from sensors of the wireless device (or an associated UE) with RF measurements to create the RF predicted environment. For example, the sensors may include proximity or light sensors that detect that a blocking wall is nearby that can abruptly change a signal from a line of sight (LOS) to a particular area to a non-LOS for the particular area as the wireless device moves. Other sensors may include an inertial measurement unit (IMU), a camera, a radar, a lidar, a proximity detector, a barometer, a magnetic compass, and/or a magnetometer that allow the wireless device to build an accurate perception of the environment. The perception may involve blockage prediction that includes predicting a sudden worsening of the link conditions due to a person or object impeding the propagation of a signal on the communication link. The perception information may be used to predict abrupt changes in the wireless channel and modify the content preemptively. The wireless device may use the perception information for the RF environment prediction and adjust link parameters accordingly. Perception information may involve motion compensation that includes predicting user motion.

If the wireless device is a UE, the UE may obtain a predicted RF environment from perception information derived from one or more sensors of the UE and transmit the RF environment prediction and/or the perception information. The RF environment prediction may include a mapping between the perception information and RF measurements in an environment around the UE. Content adaptation may include virtual content adaptation based on RF and environment perception.

If the wireless communication device is a network entity (e.g., base station 110, edge agent 130), the network entity may obtain a first RF environment prediction associated with an environment around the UE. The network entity may transmit the first RF environment prediction to a content provider device (e.g., content provider 132). The network entity may obtain other RF environment predictions around other UEs. The network entity may transmit the other RF environment predictions to the content provider device.

The network entity may be an edge entity (e.g., edge agent 130) that generates multi-user content based at least in part on the first RF environment prediction and the other RF environment predictions. In some aspects, the network entity may receive additional channel information of one or more communication links of one or more other UEs. The network entity may transmit the additional channel information to the content provider device. The network entity may generate multi-user content based at least in part on the channel information and the additional channel information.

The content provider may receive location information and position information (e.g., pose information, orientation information) for a UE in association with the XR application on the UE. The content provider may predict user behavior in the XR application or receive an indication of predicted user behavior. The content provider may obtain predicted channel information for a communication link of the UE that is predicted based at least in part on the predicted user behavior. The content provider may generate content for the XR application based at least in part on the location information, the position information, and the predicted channel information. The content provider may transmit the content for the XR application for the wireless device.

In some aspects, the content provider may obtain additional predicted channel information of one or more communication links of one or more other UEs and generate multi-user content based at least in part on the predicted channel information and the additional predicted channel information. The content provider may receive a first RF environment prediction around the UE and generate content further based at least in part on the first RF environment prediction. The content provider may generate content for the application that directs user behavior toward a target geographical area for the first RF environment prediction. The content provider may receive one or more other RF environment predictions around one or more other UEs and generate multi-user content based at least in part on the first RF environment prediction and the one or more other RF environment predictions. That is, the edge agent or the content provider may aggregate the information for multiple users and generate customized and better content for individual users in the multi-user environment.

In some aspects, the content provider is separate from the edge agent and the UE. In some aspects, the content provider is located at the edge agent. In some aspects, the content provider may be at the UE.

By adjusting communication link parameters based at least in part on predicted user behavior and influencing user behavior to obtain RF environment predictions, the UE may improve or maintain the communication link to avoid degradation of the user experience with the XR application. An improved communication link also conserves power, processing resources, and signaling resources wasted due to failed communications.

As indicated above, FIG. 4 is provided merely as an example. Other examples may differ from what is described with regard to FIG. 4.

Figure 5:
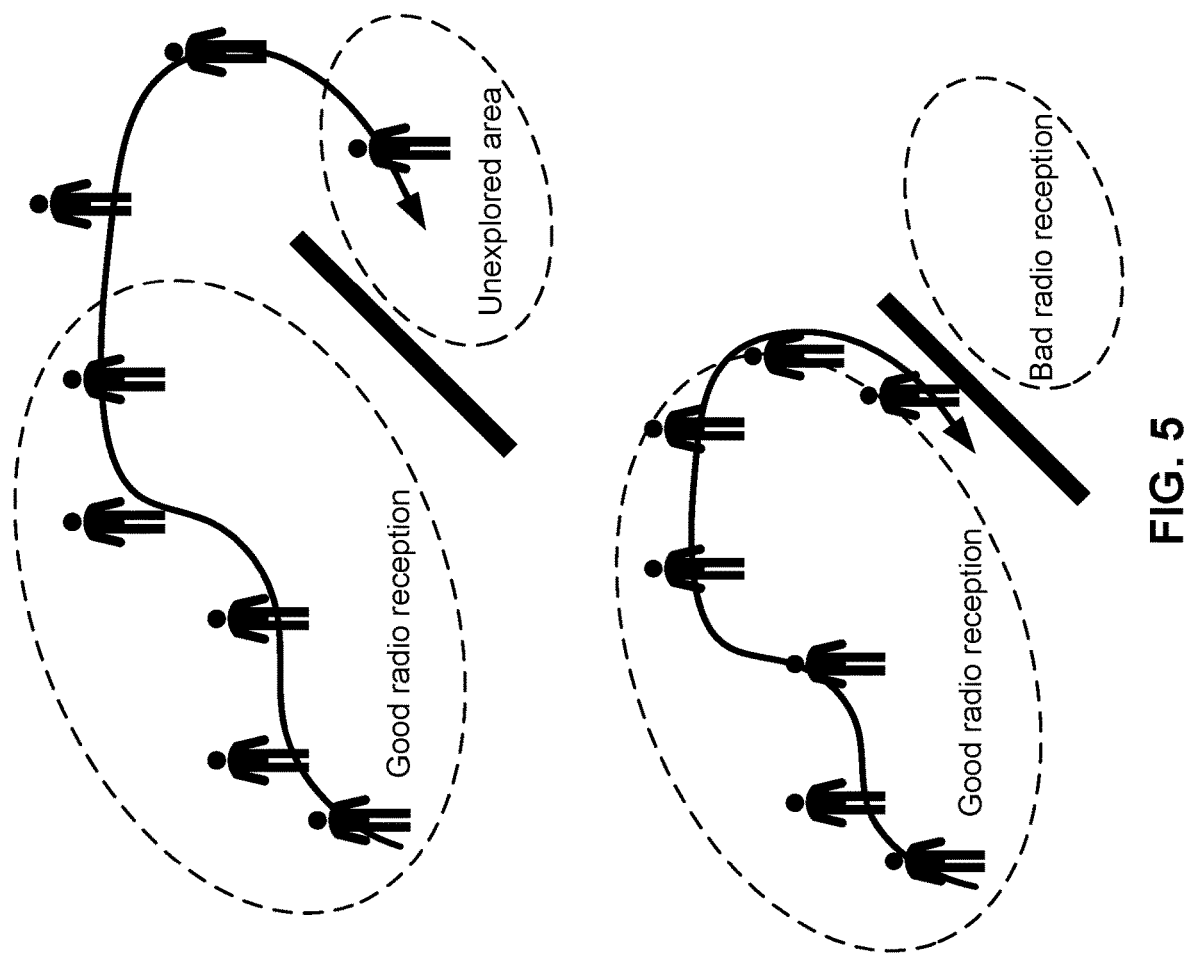
FIG. 5 is a diagram illustrating examples of a radio frequency environment, in accordance with the present disclosure.

FIG. 5 is a diagram illustrating examples 500 and 502 of an RF environment, in accordance with the present disclosure.

If the environment is static, the wireless device may obtain a wireless channel survey. The wireless device may use the wireless channel survey to generate an RF heat map, which can be used for reorienting application content. The RF heat map may indicate RF conditions for different geographical areas of a map of a real-world area. If the environment is dynamic, the wireless channel survey may be obtained periodically.

Example 500 shows an RF heat map for real-world geographical areas where a user may travel while using an XR application. The XR application may be an AR game that uses a mobile device with a global positioning system (GPS) that interacts with virtual creatures. The XR application may lead the user through the geographical area in search of the virtual creatures that appear as if to be present in the geographical area.

The wireless device may obtain a wireless channel survey as part of an exploration phase. To lead the user into a part of the geographical area, the XR application may present a virtual creature in or headed to an area to be surveyed. The user may pass through an area of good radio reception or coverage (e.g., above a threshold) and into an unexplored area. In example 500, the unexplored area results in RF measurements that indicate an area of bad radio reception or coverage (e.g., signal strength or quality below a threshold). This may be due to a blocking object such as a wall. Unexplored areas may also have good radio reception. Sensors of the wireless device may generate perception information. The sensors, such as proximity sensors, light sensors, or radar sensors, may obtain information about the environment. The wireless device may use the RF measurements and perception information to form an RF environment prediction.

Example 502 may be part of a usage phase that uses the RF environment prediction to direct the user away from the area of bad radio reception and to remain in the area of good radio reception. The wireless device or the content provider may also provide more detailed content in the good reception area. If the user enters the area of bad reception, the UE may adjust communication link parameters or application content to account for the weaker communication link in the bad reception area. That is, the application content may align with the quality of the communication link and the RF environment prediction. The content provider, edge agent, UE, or other network entity providing the application content may subscribe to a service for receiving updates of the predicted user behavior, the perception information, and/or RF environment predictions. In some aspects, the wireless device or the content provider may switch between the exploration phase and the usage phase based at least in part on a loss function or a communication link threshold.

As indicated above, FIG. 5 provides some examples. Other examples may differ from what is described with regard to FIG. 5.

Figure 6:
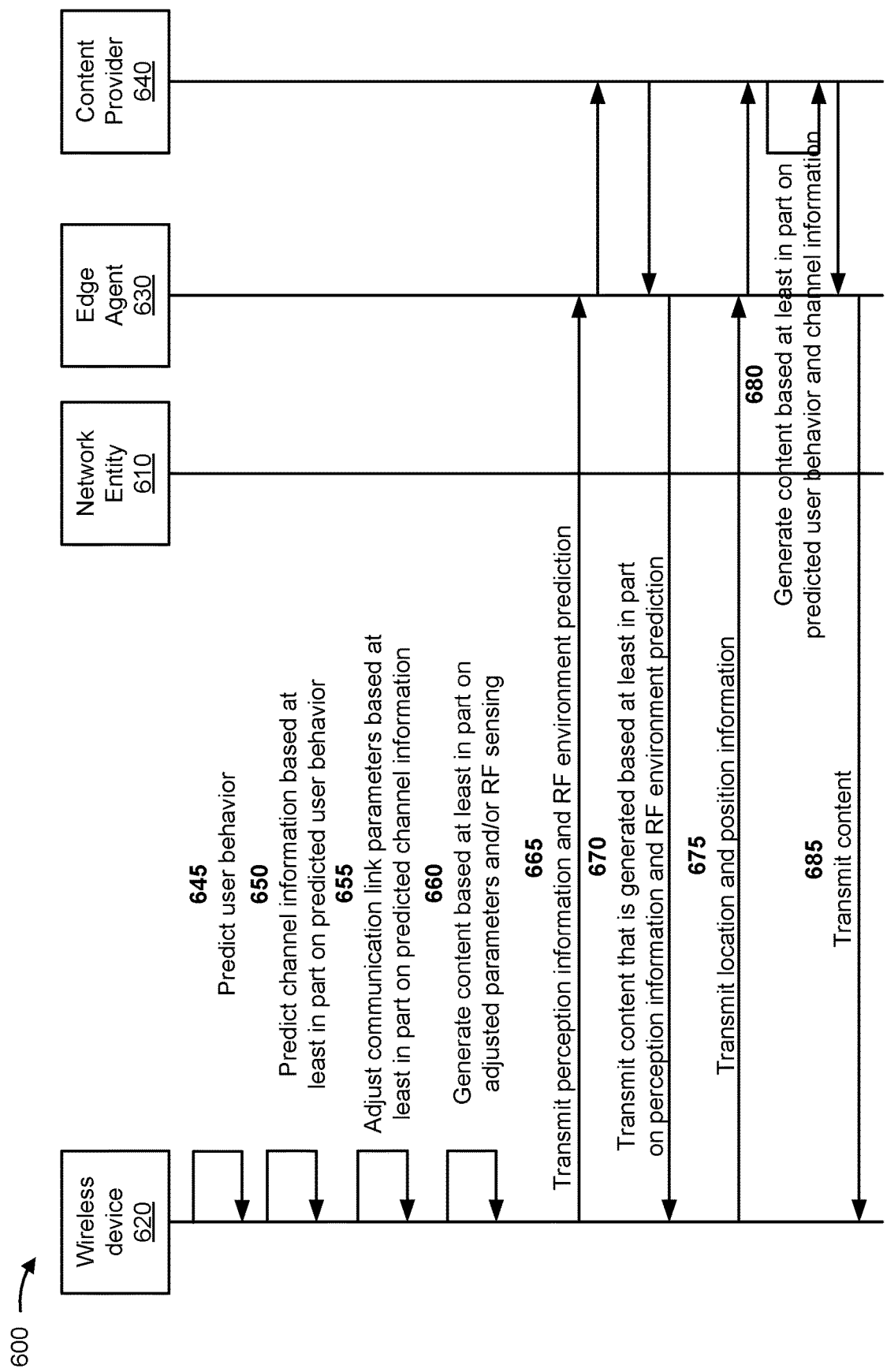
FIG. 6 is a diagram illustrating an example associated with using predicted user behavior to adjust communication link parameters, in accordance with the present disclosure.

FIG. 6 is a diagram illustrating an example 600 associated with using predicted user behavior to adjust communication link parameters, in accordance with the present disclosure. As shown in FIG. 6, a network entity 610 (e.g., base station 110) and a wireless device 620 (e.g., a UE 120) may communicate with each other. The wireless device may also communicate with an edge agent 630 (e.g., edge agent 130) via the network entity 610. The edge agent 630 may communicate with a content provider 640 (e.g., content provider 132). The edge agent 630 and the content provider 640 may provide application content for an application (e.g., XR application) on the wireless device 620.

In some aspects, the wireless device 620 may adjust parameters of a communication link and render content based at least in part on the adjusted parameters. As shown by reference number 645, the wireless device 620 may predict user behavior in the XR application based at least in part on current content presented by the XR application. The wireless device 620 may also predict the user behavior based at least in part on a position, an orientation, a movement, choices, a pattern of activity, or other actions by the user in the XR application. The predicted user behavior may indicate where the user is headed, what type of activity will take place, and/or what content is to be expected.

As shown by reference number 650, the wireless device 620 may predict channel information for a communication link based at least in part on the predicted user behavior, such as a future location of the user. In some aspects, the wireless device 620 may capture different wireless channel parameters based on the user's actions, and then the edge agent 630 and/or the wireless device 620 may analyze these parameters to predict the wireless channel. The wireless device 620 may transmit wireless channel information to the edge agent 630.

As shown by reference number 655, the wireless device 620 may adjust communication link parameters based at least in part on the predicted channel information. The content provider 640 may signal the edge agent 630 or the network entity 610 in the RAN to adjust the link parameters. In some aspects, as shown by reference number 660, the wireless device 620 may generate content based at least in part on the adjusted communication link parameters. This may include generating content based at least in part on the effect of the adjustment of the parameters.

In some aspects, the wireless device 620 may use perception information and RF environment predictions. As shown by reference number 665, the wireless device 620 may transmit perception information obtained from sensors and an RF environment prediction obtained from RF measurements. The network entity 610 may also transmit RF environment predictions for other UEs. As shown by reference number 670, the edge agent 630 and/or the content provider 640 may transmit content that is generated based at least in part on the perception information and the RF environment prediction (or perception information and/or multiple RF environment predictions for multiple users in a multi-user application). The information and predictions may involve an exploration phase and a usage phase.

In some aspects, the content provider may use user location and position information. As shown by reference number 675, the wireless device 620 may transmit location and position information of the user. The content provider 640 (or the edge agent 630) may use the location and position information to predict user behavior in the XR application. The wireless device 620 may also transmit an indication of predicted user behavior. The content provider 640 (or the edge agent 630) may obtain (e.g., determine or receive) predicted channel information based at least in part on the predicted user behavior. As shown by reference number 680, the content provider 640 (or the edge agent 630) may generate content based at least in part on the predicted user behavior and the predicted channel information. As shown by reference number 685, the content provider 640 (or the edge agent 630) may transmit the content, which may include transmitting information for generating the content.

The information transmission and content generation shown in example 600 is just one of many combinations of information transmission and content generation that may take place for the XR application. Other examples may involve content generation or information gathering performed by other combinations of entities. For example, the edge agent 630 and the content provider 640 may be co-located. In another example, the RF environment prediction (e.g., RF heat map) may be determined at the wireless device 620 or the edge agent 630. Actions at the wireless device 620 may involve one device or multiple devices, such as a smartphone and/or a connected wearable device. In some aspects, the content generation may take place at the wireless device 620 (with occasional updates from the edge agent 630 or the content provider 640). The rate of the adjustments may vary based at least in part on the environment, type of game, processing resources, and/or signaling resources.

By utilizing dependencies between application content, user behavior, and the communication link, the performance of the XR application and the user experience can be improved. Improved performance and communication link parameter adjustments also conserve power, processing resources, and signaling resources.

As indicated above, FIG. 6 is provided as an example. Other examples may differ from what is described with regard to FIG. 6.

Figure 7:
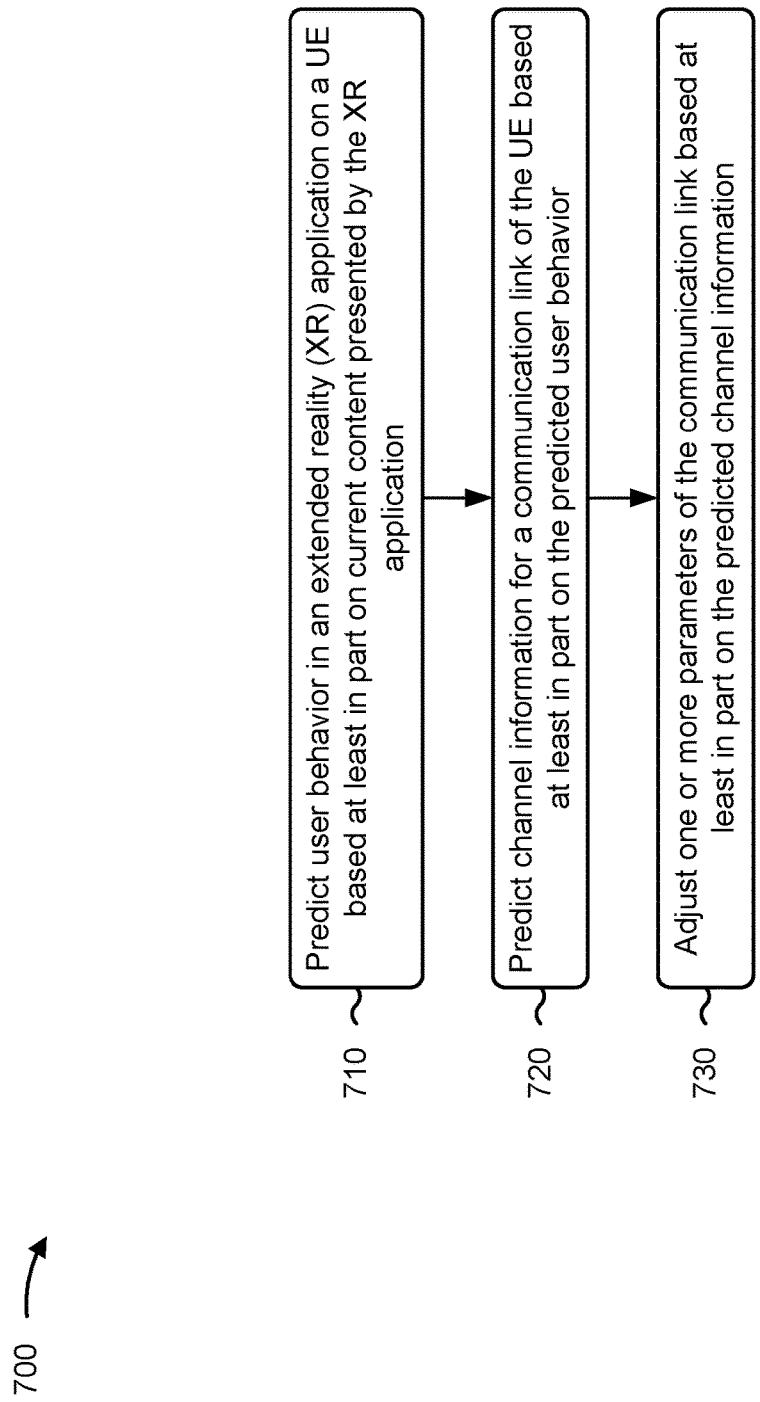
FIG. 7 is a diagram illustrating an example process performed, for example, by a wireless communication device, in accordance with the present disclosure.

FIG. 7 is a diagram illustrating an example process 700 performed, for example, by a wireless communication device, in accordance with the present disclosure. Example process 700 is an example where the wireless communication device (e.g., wireless device 620, network entity 610, edge agent 630) performs operations associated with adjusting communication links for predicted user behavior.

As shown in FIG. 7, in some aspects, process 700 may include predicting user behavior in an XR application on a UE based at least in part on current content presented by the XR application (block 710). For example, the wireless communication device (e.g., using communication manager 908 and/or prediction component 910 depicted in FIG. 9) may predict user behavior in an XR application on a UE based at least in part on current content presented by the XR application, as described above in connection with FIGS. 4-6.

As further shown in FIG. 7, in some aspects, process 700 may include predicting channel information for a communication link of the UE based at least in part on the predicted user behavior (block 720). For example, the wireless communication device (e.g., using communication manager 908 and/or prediction component 910 depicted in FIG. 9) may predict channel information for a communication link of the UE based at least in part on the predicted user behavior, as described above in connection with FIGS. 4-6.

As further shown in FIG. 7, in some aspects, process 700 may include adjusting one or more parameters of the communication link based at least in part on the predicted channel information (block 730). For example, the wireless communication device (e.g., using communication manager 908 and/or adjustment component 912 depicted in FIG. 9) may adjust one or more parameters of the communication link based at least in part on the predicted channel information, as described above in connection with FIGS. 4-6.

Process 700 may include additional aspects, such as any single aspect or any combination of aspects described below and/or in connection with one or more other processes described elsewhere herein.

In a first aspect, process 700 includes generating content for the XR application based at least in part on the adjusted one or more parameters.

In a second aspect, alone or in combination with the first aspect, process 700 includes generating content for the XR application based at least in part on RF sensing of an environment around the UE.

In a third aspect, alone or in combination with one or more of the first and second aspects, process 700 includes generating content for the XR application that directs user behavior toward a target geographical area for RF measurements of an environment around the UE.

In a fourth aspect, alone or in combination with one or more of the first through third aspects, adjusting the one or more parameters includes increasing or decreasing a transmit power for communications on the communication link.

In a fifth aspect, alone or in combination with one or more of the first through fourth aspects, adjusting the one or more parameters includes switching beams for communications on the communication link.

In a sixth aspect, alone or in combination with one or more of the first through fifth aspects, predicting user behavior includes predicting one or more of a position of the UE, an orientation of the UE, a movement of the UE, or a position of a user of the UE in association with the current content of the XR application.

In a seventh aspect, alone or in combination with one or more of the first through sixth aspects, predicting user behavior includes predicting one or more of a game state of the XR application, an amount of activity of a user of the UE in the XR application, or a type of activity of the user.

In an eighth aspect, alone or in combination with one or more of the first through seventh aspects, the wireless communication device is the UE.

In a ninth aspect, alone or in combination with one or more of the first through eighth aspects, process 700 includes obtaining an RF environment prediction from perception information derived from one or more sensors of the UE, and transmitting the RF environment prediction.

In a tenth aspect, alone or in combination with one or more of the first through ninth aspects, the RF environment prediction includes a mapping between the perception information and RF measurements in an environment around the UE.

In an eleventh aspect, alone or in combination with one or more of the first through tenth aspects, the wireless communication device is a network entity.

In a twelfth aspect, alone or in combination with one or more of the first through eleventh aspects, process 700 includes obtaining a first RF environment prediction associated with an environment around the UE.

In a thirteenth aspect, alone or in combination with one or more of the first through twelfth aspects, process 700 includes transmitting the first RF environment prediction to a content provider device.

In a fourteenth aspect, alone or in combination with one or more of the first through thirteenth aspects, process 700 includes obtaining one or more other RF environment predictions around one or more other UEs.

In a fifteenth aspect, alone or in combination with one or more of the first through fourteenth aspects, process 700 includes transmitting the one or more other RF environment predictions to a content provider device.

In a sixteenth aspect, alone or in combination with one or more of the first through fifteenth aspects, the network entity is an edge entity that generates content, and process 700 includes generating multi-user content based at least in part on the first RF environment prediction and the one or more other RF environment predictions.

In a seventeenth aspect, alone or in combination with one or more of the first through sixteenth aspects, process 700 includes receiving additional channel information of one or more communication links of one or more other UEs.

In an eighteenth aspect, alone or in combination with one or more of the first through seventeenth aspects, process 700 includes transmitting the additional channel information to a content provider device.

In a nineteenth aspect, alone or in combination with one or more of the first through eighteenth aspects, the network entity is an edge entity that generates content, and process 700 includes generating multi-user content based at least in part on the channel information and the additional channel information.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
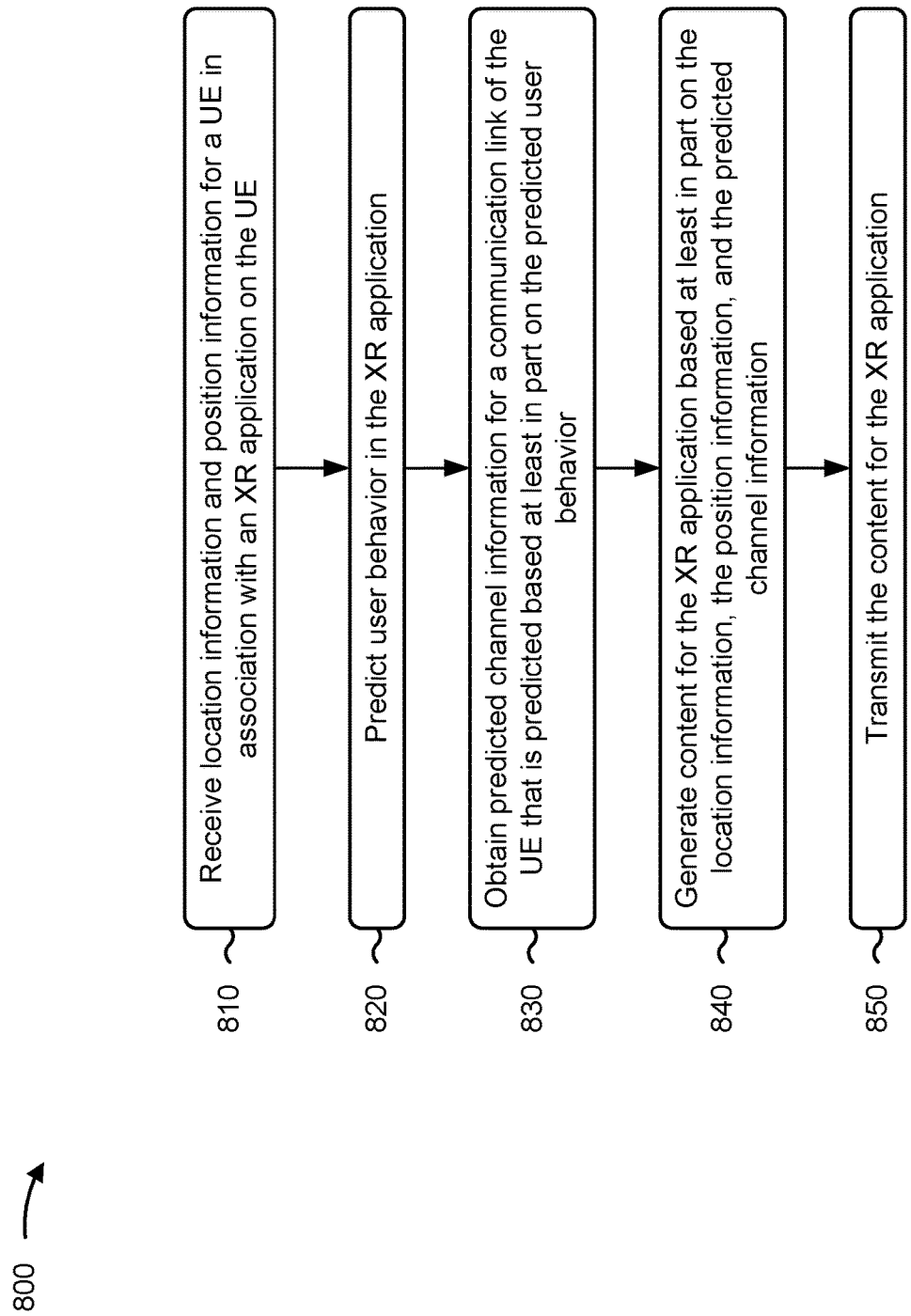
FIG. 8 is a diagram illustrating an example process performed, for example, by a content provider device, in accordance with the present disclosure.

FIG. 8 is a diagram illustrating an example process 800 performed, for example, by a content provider device, in accordance with the present disclosure. Example process 800 is an example where the content provider device (e.g., content provider 640) performs operations associated with providing content based on predicted user behavior.

As shown in FIG. 8, in some aspects, process 800 may include receiving location information and position information for a UE in association with an XR application on the UE (block 810). For example, the content provider device (e.g., using communication manager 1008 and/or reception component 1002 depicted in FIG. 10) may receive location information and position information for a UE in association with an XR application on the UE, as described above in connection with FIGS. 4-6.

As further shown in FIG. 8, in some aspects, process 800 may include predicting user behavior in the XR application (block 820). For example, the content provider device (e.g., using communication manager 1008 and/or prediction component 1010 depicted in FIG. 10) may predict user behavior in the XR application, as described above in connection with FIGS. 4-6.

As further shown in FIG. 8, in some aspects, process 800 may include obtaining predicted channel information for a communication link of the UE that is predicted based at least in part on the predicted user behavior (block 830). For example, the content provider device (e.g., using communication manager 1008, reception component 1002, and/or prediction component 1010 depicted in FIG. 10) may obtain predicted channel information for a communication link of the UE that is predicted based at least in part on the predicted user behavior, as described above in connection with FIGS. 4-6.

As further shown in FIG. 8, in some aspects, process 800 may include generating content for the XR application based at least in part on the location information, the position information, and the predicted channel information (block 840). For example, the content provider device (e.g., using communication manager 1008 and/or content component 1012 depicted in FIG. 10) may generate content for the XR application based at least in part on the location information, the position information, and the predicted channel information, as described above in connection with FIGS. 4-6.

As further shown in FIG. 8, in some aspects, process 800 may include transmitting the content for the XR application (block 850). For example, the content provider device (e.g., using communication manager 1008 and/or transmission component 1004 depicted in FIG. 10) may transmit the content for the XR application, as described above in connection with FIGS. 4-6.

Process 800 may include additional aspects, such as any single aspect or any combination of aspects described below and/or in connection with one or more other processes described elsewhere herein.

In a first aspect, process 800 includes obtaining additional predicted channel information of one or more communication links of one or more other UEs, where generating the content includes generating multi-user content based at least in part on the predicted channel information and the additional predicted channel information.

In a second aspect, alone or in combination with the first aspect, process 800 includes receiving a first RF environment prediction around the UE, where generating the content includes generating content further based at least in part on the first RF environment prediction.

In a third aspect, alone or in combination with one or more of the first and second aspects, generating the content includes generating content for the application that directs user behavior toward a target geographical area for the first RF environment prediction.

In a fourth aspect, alone or in combination with one or more of the first through third aspects, process 800 includes receiving one or more other RF environment predictions around one or more other UEs, where generating the content includes generating multi-user content based at least in part on the first RF environment prediction and the one or more other RF environment predictions.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
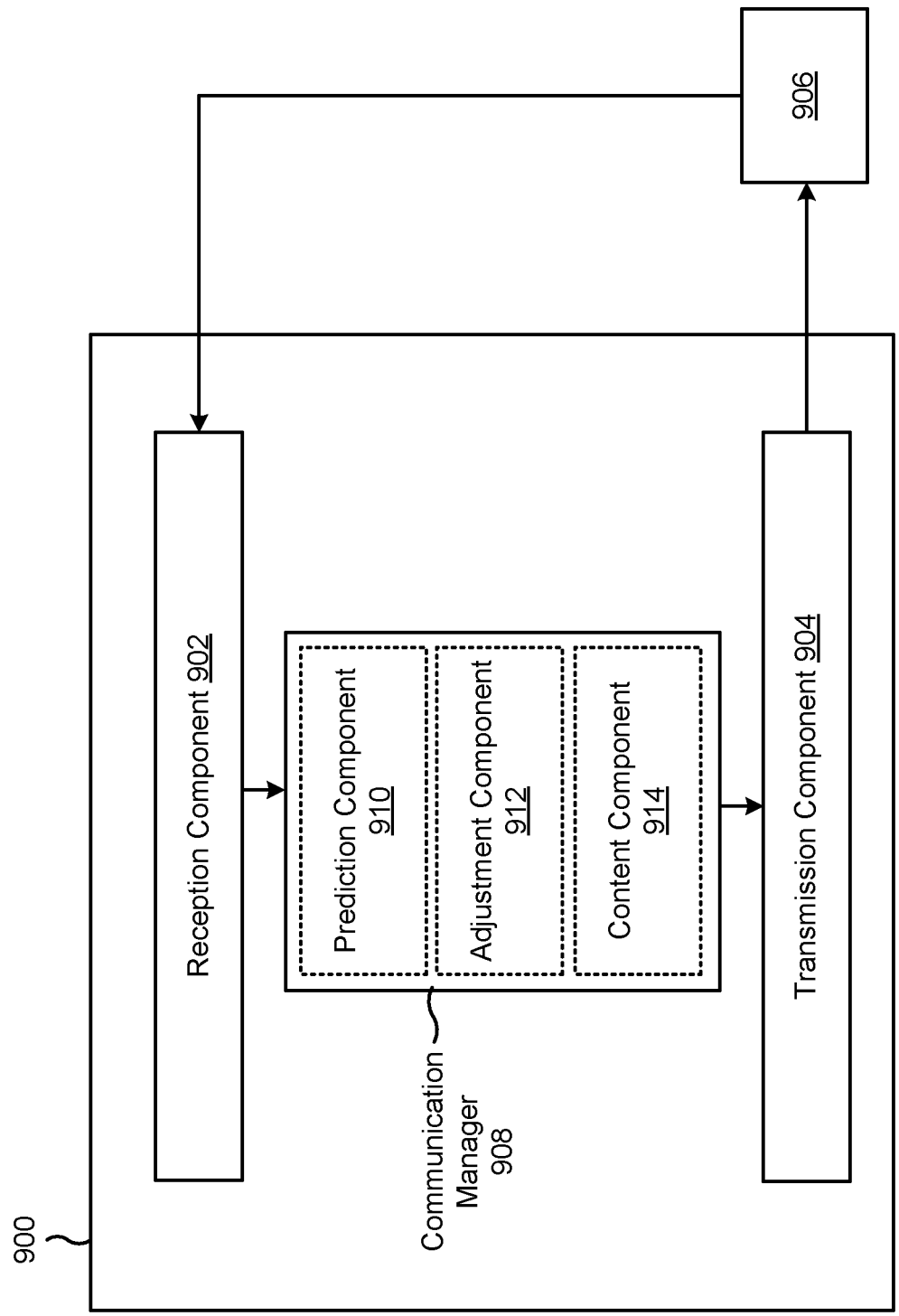
FIG. 9 is a diagram of an example apparatus for wireless communication, in accordance with the present disclosure.

FIG. 9 is a diagram of an example apparatus 900 for wireless communication, in accordance with the present disclosure. The apparatus 900 may be a wireless device (e.g., UE 120, network entity, edge agent 130), or a wireless device may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, network entity, edge agent, content provider, or another wireless communication device) using the reception component 902 and the transmission component 904. As further shown, the apparatus 900 may include the communication manager 908. The communication manager 908 may control and/or otherwise manage one or more operations of the reception component 902 and/or the transmission component 904. In some aspects, the communication manager 908 may include one or more antennas, a modem, a controller/processor, a memory, or a combination thereof, of the UE, base station, or edge agent described in connection with FIG. 2. The communication manager 908 may be, or be similar to, the communication manager 140, 150, or 160 depicted in FIGS. 1 and 2. For example, in some aspects, the communication manager 908 may be configured to perform one or more of the functions described as being performed by the communication manager 140, 150, or 160. In some aspects, the communication manager 908 may include the reception component 902 and/or the transmission component 904. The communication manager 908 may include a prediction component 910, an adjustment component 912, and/or a content component 914 among other examples.

In some aspects, the apparatus 900 may be configured to perform one or more operations described herein in connection with FIGS. 1-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the wireless device described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the wireless device described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the wireless device described in connection with FIG. 2. In some aspects, the transmission component 904 may be co-located with the reception component 902 in a transceiver.

The prediction component 910 may predict user behavior in an XR application on a UE based at least in part on current content presented by the XR application. The wireless device may be the UE. The prediction component 910 may predict channel information for a communication link of the UE based at least in part on the predicted user behavior. The adjustment component 912 may adjust one or more parameters of the communication link based at least in part on the predicted channel information.

The content component 914 may generate content for the XR application based at least in part on the adjusted one or more parameters. The content component 914 may generate content for the XR application based at least in part on radio frequency sensing of an environment around the UE. The content component 914 may generate content for the XR application that directs user behavior toward a target geographical area for radio frequency measurements of an environment around the UE.

The prediction component 910 may obtain an RF environment prediction from perception information derived from one or more sensors of the UE. The transmission component 904 may transmit the RF environment prediction.

The prediction component 910 may obtain a first RF environment prediction associated with an environment around the UE. The transmission component 904 may transmit the first RF environment prediction to a content provider device. The prediction component 910 may obtain one or more other RF environment predictions around one or more other UEs. The transmission component 904 may transmit the one or more other RF environment predictions to a content provider device.

The reception component 902 may receive additional channel information of one or more communication links of one or more other UEs. The transmission component 904 may transmit the additional channel information to a content provider device.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
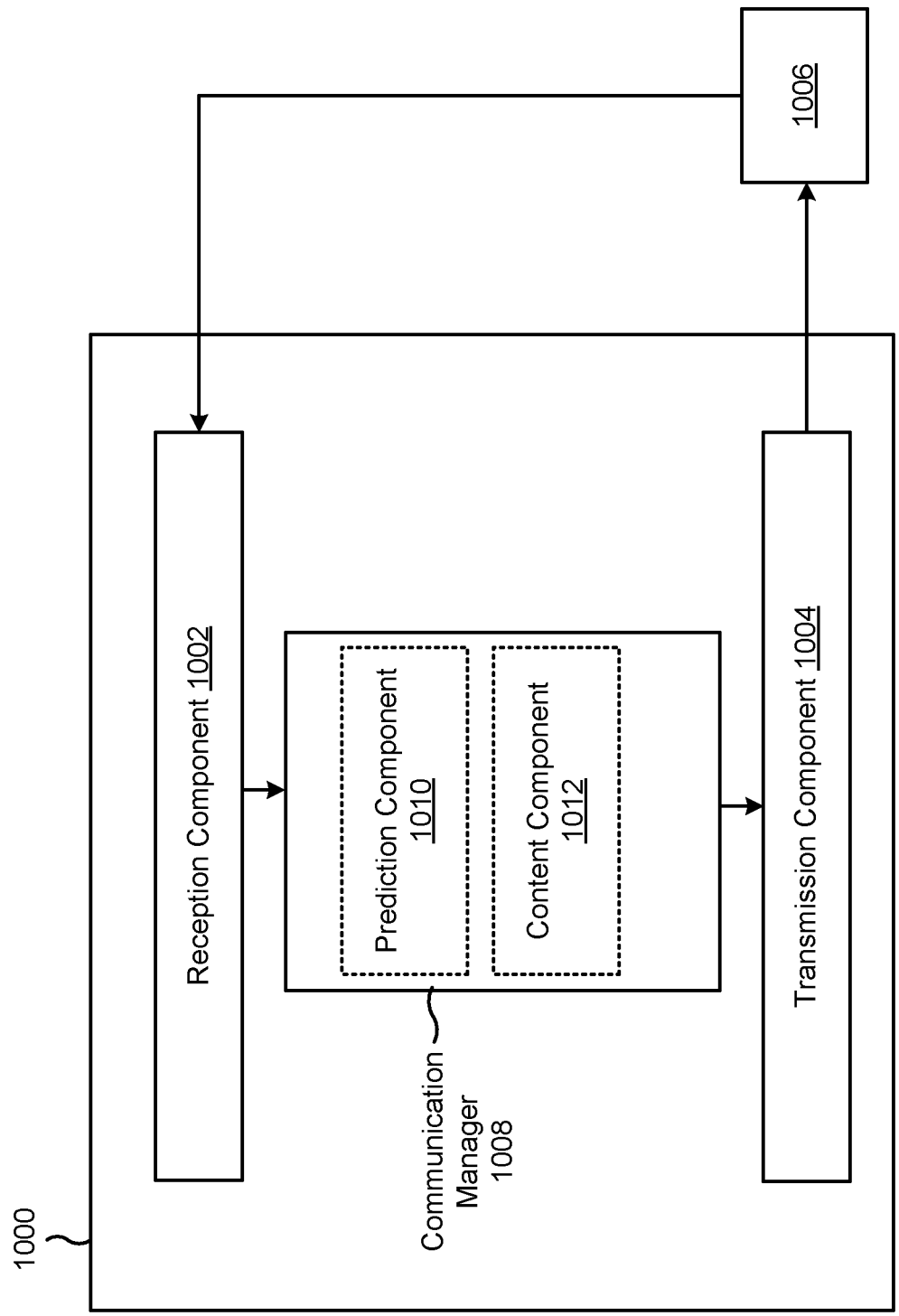
FIG. 10 is a diagram of an example apparatus for wireless communication, in accordance with the present disclosure.

FIG. 10 is a diagram of an example apparatus 1000 for wireless communication, in accordance with the present disclosure. The apparatus 1000 may be a content provider device (e.g., content provider 132), or a content provider device may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 1008. The communication manager 1008 may control and/or otherwise manage one or more operations of the reception component 1002 and/or the transmission component 1004. In some aspects, the communication manager 1008 may include one or more antennas, a modem, a controller/processor, a memory, or a combination thereof, of the content provider described in connection with FIG. 2. The communication manager 1008 may be, or be similar to, the communication manager 170 depicted in FIGS. 1 and 2. For example, in some aspects, the communication manager 1008 may be configured to perform one or more of the functions described as being performed by the communication manager 170. In some aspects, the communication manager 1008 may include the reception component 1002 and/or the transmission component 1004. The communication manager 1008 may include a prediction component 1010 and/or a content component 1012, among other examples.

In some aspects, the apparatus 1000 may be configured to perform one or more operations described herein in connection with FIGS. 1-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the content provider device described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the content provider device described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the content provider device described in connection with FIG. 2.

In some aspects, the transmission component 1004 may be co-located with the reception component 1002 in a transceiver.

The reception component 1002 may receive location information and position information for a UE in association with an XR application on the UE. The prediction component 1010 may predict user behavior in the XR application. The prediction component 1010 or the reception component 1002 may obtain predicted channel information for a communication link of the UE that is predicted based at least in part on the predicted user behavior. The content component 1012 may generate content for the XR application based at least in part on the location information, the position information, and the predicted channel information. The transmission component 1004 may transmit the content for the XR application.

The prediction component 1010 or the reception component 1002 may obtain additional predicted channel information of one or more communication links of one or more other UEs. The content component 1012 may generate multi-user content based at least in part on the predicted channel information and the additional predicted channel information.

The reception component 1002 may receive a first RF environment prediction around the UE. The content component 1012 may generate content further based at least in part on the first RF environment prediction.

The reception component 1002 may receive one or more other RF environment predictions around one or more other UEs. The content component 1012 may generate multi-user content based at least in part on the first RF environment prediction and the one or more other RF environment predictions.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a wireless communication device, comprising: predicting user behavior in an extended reality (XR) application on a user equipment (UE) based at least in part on current content presented by the XR application; predicting channel information for a communication link of the UE based at least in part on the predicted user behavior; and adjusting one or more parameters of the communication link based at least in part on the predicted channel information.

Aspect 2: The method of Aspect 1, further comprising generating content for the XR application based at least in part on the adjusted one or more parameters.

Aspect 3: The method of Aspect 1 or 2, further comprising generating content for the XR application based at least in part on radio frequency sensing of an environment around the UE.

Aspect 4: The method of any of Aspects 1-3, further comprising generating content for the XR application that directs user behavior toward a target geographical area for radio frequency measurements of an environment around the UE.

Aspect 5: The method of any of Aspects 1-4, wherein adjusting the one or more parameters includes increasing or decreasing a transmit power for communications on the communication link.

Aspect 6: The method of any of Aspects 1-5, wherein adjusting the one or more parameters includes switching beams for communications on the communication link.

Aspect 7: The method of any of Aspects 1-6, wherein predicting user behavior includes predicting one or more of a position of the UE, an orientation of the UE, a movement of the UE, or a position of a user of the UE in association with the current content of the XR application.

Aspect 8: The method of any of Aspects 1-7, wherein predicting user behavior includes predicting one or more of a game state of the XR application, an amount of activity of a user of the UE in the XR application, or a type of activity of the user.

Aspect 9: The method of any of Aspects 1-8, wherein the wireless communication device is the UE.

Aspect 10: The method of Aspect 9, further comprising: obtaining a radio frequency (RF) environment prediction from perception information derived from one or more sensors of the UE; and transmitting the RF environment prediction.

Aspect 11: The method of Aspect 10, wherein the RF environment prediction includes a mapping between the perception information and RF measurements in an environment around the UE.

Aspect 12: The method of any of Aspects 1-11, wherein the wireless communication device is a network entity.

Aspect 13: The method of Aspect 12, further comprising obtaining a first radio frequency (RF) environment prediction associated with an environment around the UE.

Aspect 14: The method of Aspect 13, further comprising transmitting the first RF environment prediction to a content provider device.

Aspect 15: The method of Aspect 13 or 14, further comprising obtaining one or more other RF environment predictions around one or more other UEs.

Aspect 16: The method of Aspect 15, further comprising transmitting the one or more other RF environment predictions to a content provider device.

Aspect 17: The method of Aspect 15 or 16, wherein the network entity is an edge entity that generates content, and wherein the method includes generating multi-user content based at least in part on the first RF environment prediction and the one or more other RF environment predictions.

Aspect 18: The method of any of Aspects 12-17, further comprising receiving additional channel information of one or more communication links of one or more other UEs.

Aspect 19: The method of Aspect 18, further comprising transmitting the additional channel information to a content provider device.

Aspect 20: The method of Aspect 18 or 19, wherein the network entity is an edge entity that generates content, and wherein the method includes generating multi-user content based at least in part on the channel information and the additional channel information.

Aspect 21: A method of wireless communication performed by a content provider device, comprising: receiving location information and position information for a user equipment (UE) in association with an extended reality (XR) application on the UE; predicting user behavior in the XR application; obtaining predicted channel information for a communication link of the UE that is predicted based at least in part on the predicted user behavior; generating content for the XR application based at least in part on the location information, the position information, and the predicted channel information; and transmitting the content for the XR application.

Aspect 22: The method of Aspect 21, further comprising obtaining additional predicted channel information of one or more communication links of one or more other UEs, wherein generating the content includes generating multi-user content based at least in part on the predicted channel information and the additional predicted channel information.

Aspect 23: The method of Aspect 21 or 22, further comprising receiving a first radio frequency (RF) environment prediction around the UE, wherein generating the content includes generating content further based at least in part on the first RF environment prediction.

Aspect 24: The method of Aspect 23, wherein generating the content includes generating content for the application that directs user behavior toward a target geographical area for the first RF environment prediction.

Aspect 25: The method of Aspect 23 or 24, further comprising receiving one or more other RF environment predictions around one or more other UEs, wherein generating the content includes generating multi-user content based at least in part on the first RF environment prediction and the one or more other RF environment predictions.

Aspect 26: An apparatus for wireless communication at a device, comprising a processor; memory coupled with the processor; and instructions stored in the memory and executable by the processor to cause the apparatus to perform the method of one or more of Aspects 1-25.

Aspect 27: A device for wireless communication, comprising a memory and one or more processors coupled to the memory, the one or more processors configured to perform the method of one or more of Aspects 1-25.

Aspect 28: An apparatus for wireless communication, comprising at least one means for performing the method of one or more of Aspects 1-25.

Aspect 29: A non-transitory computer-readable medium storing code for wireless communication, the code comprising instructions executable by a processor to perform the method of one or more of Aspects 1-25.

Aspect 30: A non-transitory computer-readable medium storing a set of instructions for wireless communication, the set of instructions comprising one or more instructions that, when executed by one or more processors of a device, cause the device to perform the method of one or more of Aspects 1-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
   one or more memories; and
   one or more processors, coupled to the one or more memories, configured to:
      predict user behavior in an extended reality (XR) application on a user equipment (UE) based at least in part on current content presented by the XR application;
      predict channel information for a communication link of the UE based at least in part on the predicted user behavior; and
      adjust one or more parameters of the communication link based at least in part on the predicted channel information.

2. The wireless communication device of claim 1, wherein the one or more processors are configured to generate content for the XR application based at least in part on the adjusted one or more parameters.

3. The wireless communication device of claim 1, wherein the one or more processors are configured to generate content for the XR application based at least in part on radio frequency sensing of an environment around the UE.

4. The wireless communication device of claim 1, wherein the one or more processors are configured to generate content for the XR application that directs user behavior in the XR application toward a target real-world geographical area for radio frequency measurements of a real world environment, including the target real-world geographical area, around the UE.

5. The wireless communication device of claim 1, wherein the one or more processors, to adjust the one or more parameters, are configured to increase or decreasing a transmit power for communications on the communication link.

6. The wireless communication device of claim 1, wherein the one or more processors, to adjust the one or more parameters, are configured to switch beams for communications on the communication link.

7. The wireless communication device of claim 1, wherein the one or more processors, to predict user behavior, are configured to predict one or more of a position of the UE, an orientation of the UE, a movement of the UE, or a position of a user of the UE in association with the current content of the XR application.

8. The wireless communication device of claim 1, wherein the one or more processors, to predict user behavior, are configured to predict one or more of a game state of the XR application, an amount of activity of a user of the UE in the XR application, or a type of activity of the user.

9. The wireless communication device of claim 1, wherein the wireless communication device is the UE.

10. The wireless communication device of claim 9, wherein the one or more processors are configured to:
   obtain a radio frequency (RF) environment prediction from perception information derived from one or more sensors of the UE; and
   transmit the RF environment prediction.

11. The wireless communication device of claim 10, wherein the RF environment prediction includes a mapping between the perception information and RF measurements in an environment around the UE.

12. The wireless communication device of claim 1, wherein the wireless communication device is a network entity.

13. The wireless communication device of claim 12, wherein the one or more processors are configured to obtain a first radio frequency (RF) environment prediction associated with an environment around the UE.

14. The wireless communication device of claim 13, wherein the one or more processors are configured to transmit the first RF environment prediction to a content provider device.

15. The wireless communication device of claim 13, wherein the one or more processors are configured to obtain one or more other RF environment predictions around one or more other UEs.

16. The wireless communication device of claim 15, wherein the one or more processors are configured to transmit the one or more other RF environment predictions to a content provider device.

17. The wireless communication device of claim 15, wherein the network entity is an edge entity that generates content, and wherein the one or more processors are configured to generate multi-user content based at least in part on the first RF environment prediction and the one or more other RF environment predictions.

18. The wireless communication device of claim 12, wherein the one or more processors are configured to receive additional channel information of one or more communication links of one or more other UEs.

19. The wireless communication device of claim 18, wherein the one or more processors are configured to transmit the additional channel information to a content provider device.

20. The wireless communication device of claim 18, wherein the network entity is an edge entity that generates content, and wherein the one or more processors are configured to generate multi-user content based at least in part on the channel information and the additional channel information.

21. A content provider device for wireless communication, comprising:
one or more memories; and
one or more processors, coupled to the one or more memories, configured to:
receive location information and position information for a user equipment (UE) in association with an extended reality (XR) application on the UE;
predict user behavior in the XR application;
obtain predicted channel information for a communication link of the UE that is predicted based at least in part on the predicted user behavior;
generate content for the XR application based at least in part on the location information, the position information, and the predicted channel information; and
transmit the content for the XR application.

22. The content provider device of claim 21, wherein the one or more processors are configured to obtain additional predicted channel information of one or more communication links of one or more other UEs, wherein the one or more processors, to generate the content, are configured to generate multi-user content based at least in part on the predicted channel information and the additional predicted channel information.

23. The content provider device of claim 21, wherein the one or more processors are configured to receive a first radio frequency (RF) environment prediction around the UE, and wherein the one or more processors, to generate the content, are configured to generate content further based at least in part on the first RF environment prediction.

24. The content provider device of claim 23, wherein the one or more processors, to generate the content, are configured to generate content for the XR application that directs user behavior in the XR application toward a target real-world geographical area for radio frequency measurements of a real world environment, including the target real-world geographical area, around the UE.

25. The content provider device of claim 23, wherein the one or more processors are configured to receive one or more other RF environment predictions around one or more other UEs, wherein the one or more processors, to generate the content, are configured to generate multi-user content based at least in part on the first RF environment prediction and the one or more other RF environment predictions.

26. A method of wireless communication performed by a wireless communication device, comprising:
predicting user behavior in an extended reality (XR) application on a user equipment (UE) based at least in part on current content presented by the XR application;
predicting channel information for a communication link of the UE based at least in part on the predicted user behavior; and
adjusting one or more parameters of the communication link based at least in part on the predicted channel information.

27. The method of claim 26, further comprising generating content for the XR application that directs user behavior in the XR application toward a target real-world geographical area for radio frequency measurements of a real world environment, including the target real-world geographical area, around the UE.

28. The method of claim 26, further comprising obtaining a radio frequency (RF) environment prediction associated with an environment around the UE.

29. The method of claim 26, further comprising:
obtaining a radio frequency (RF) environment prediction from perception information derived from one or more sensors of the UE; and
transmitting the RF environment prediction.

30. A method of wireless communication performed by a content provider device, comprising:
receiving location information and position information for a user equipment (UE) in association with an extended reality (XR) application on the UE;
predicting user behavior in the XR application;
obtaining predicted channel information for a communication link of the UE that is predicted based at least in part on the predicted user behavior;
generating content for the XR application based at least in part on the location information, the position information, and the predicted channel information; and
transmitting the content for the XR application.

* * * * *